United States Patent [19]

Suh

[11] Patent Number: 5,568,182

[45] Date of Patent: Oct. 22, 1996

[54] TELETEXT AND VIDEOTEX PROCESSING SYSTEM AND METHOD

[75] Inventor: Moon H. Suh, Seoul, Rep. of Korea

[73] Assignee: Samsung Electronics Co., Ltd., Kyungki-do, Rep. of Korea

[21] Appl. No.: 280,547

[22] Filed: Jul. 25, 1994

[30]     Foreign Application Priority Data

Jul. 23, 1993 [KR] Rep. of Korea ............... 93-14182

[51] Int. Cl.⁶ .................................................. H04N 7/14
[52] U.S. Cl. .................................................. 348/13
[58] Field of Search ........................... 379/96, 93, 94,
379/97, 98, 100, 110, 90, 102, 104, 105;
348/13, 12, 6, 7; 455/3.1, 4.1, 4.2, 5.1,
6.1, 6.3

[56]             References Cited

U.S. PATENT DOCUMENTS 4,805,134  2/1989  Calo et al. ...................... 364/900
5,093,902  3/1992  Tokumitsu ...................... 395/100
5,218,708  6/1993  Kanbayashi et al. .............. 395/800

*Primary Examiner*—Curtis Kuntz
*Assistant Examiner*—Stella L. Woo
*Attorney, Agent, or Firm*—Suhgrue, Mion, Zinn, Macpeak & Seas

[57]              ABSTRACT

A teletex and videotex processing system permits concurrent processing of broadcast teletext (TTX) transmitted through a wireless network and a videotex transmitted through a telephone network. The processing system includes a central processing unit (CPU), a TTX pre-processing circuit, a memory and graphic display control circuit, an address extension and control signal generator, a keyboard interface circuit, and a modulator and demodulator (MODEM) interface circuit and an associated keyboard and modem. Interrupt processing by the CPU permits compact construction. A corresponding method is also described.

10 Claims, 3 Drawing Sheets

TELETEXT AND VIDEOTEX PROCESSING SYSTEM AND METHOD

BACKGROUND OF THE INVENTION

1. Field of the Invention

The present invention relates generally to a teletex and videotex processing system. More specifically, the present invention relates to a teletex and videotex processing system which can concurrently process teletext (hereinafter referred to TTX) transmitted through a wireless network and a videotex transmitted through a telephone network. A corresponding TTX-videotex processing method is also disclosed.

Korean Patent Application No. 93-14182 is incorporated herein by reference for all purposes.

2. Description of the Related Art

In conventional TTX systems, the necessary information can be obtained by extraction of digital data loaded and transmitted via a broadcast signal. Accordingly, the conventional TTX has an advantage whereby the user can easily and freely obtain information. On the other hand, with TTX, the user himself (or herself) does not have an opportunity to select the information since the information transmission is made in an one-way direction, i.e., from a broadcasting station to the user.

In conventional videotex, the necessary information can be obtained by extraction of the data transmitted through a telephone network. Accordingly, a bi-directional information transmission can be made with videotex. However, the user of the videotex system is charged for transmitting the information and much time is required for obtaining the information. U.S. Pat. No. 5,093,902 issued on Mar. 3, 1992, entitled "MEMORY CONTROL APPARATUS FOR ACCESSING AN IMAGE MEMORY IN CYCLE STEALING FASHION TO READ AND WRITE VIDEOTEX SIGNALS" discloses a technique for performing a write or read operation of image data with respect to an image memory at a high speed by detecting the state of a central processing unit CPU and generating a wait signal to the CPU according to a detection result.

According to U.S. Pat. No. 5,093,902, an operation state detector receives a reference pulse generated by a timing signal generator and an access control signal output from the CPU detects the state of the CPU with respect to an access period. A wait signal generator generates the wait signal to the CPU according to the detection result from the operation state detector. A display controller receives a command from the CPU during the access period set by timing-dividing of a display period, and controls the write or read operation of the image data with respect to the image memory, thereby performing the data transmission between the CPU and the image memory at a high speed.

In machines adopted to perform this technique, it is possible to read and store the videotex data or TTX data at a high speed by controlling the CPU. However, it is impossible to carry out concurrent videotex and the TTX data processing using one system.

SUMMARY OF THE INVENTION

The principal object of the present invention is to provide a teletex and videotex processing system which overcomes the problems and disadvantages associated with conventional devices.

Another object of the present invention is to provide a teletex and videotex processing method which overcomes the problems and disadvantages of the conventional devices.

These and other objects, features and advantages according to the present invention are provided by a teletext and videotex processing system including:

- a first circuit for controlling a central processing unit (CPU) to thereby process present input data by interrupting the CPU, and for controlling an electrical erasable programmable read only memory (EEPROM) storing a telephone number of a videotex source and permanent data corresponding to an operation mode therein, after isolating teletext (TTX) data from external serial data or external image data and storing the TTX data as internal data;
- a second circuit for synchronizing a video signal and for controlling the video after receiving a horizontal/vertical synchronizing signal from the first circuit, for controlling an external video random access memory (RAM) and for producing an RGB signal externally through a random access memory digital to analog converter (RAMDAC);
- a third circuit for extending an address for controlling a font read only memory (ROM) and for producing a control signal for selecting respective system circuits and a read/write operation of the data;
- a fourth circuit providing an interface function between an external keyboard and the system; and
- a fifth circuit providing an interface function between the system and a modem. In an exemplary case, the fifth circuit is operatively connected to the modem via an RS232C bus line.

These and other objects, features and advantages according to the present invention are provided by a method for controlling a teletext and videotex processing system. The method advantageously includes steps for:

(a) determining whether an interrupt request signal is produced after power is turned ON and a system is initialized;

(b) reading an interrupt flag and determining whether the interrupt request signal corresponds to a keyboard processing request signal after determining the interrupt request signal is produced in step (a);

(c) carrying out a TTX processing request, producing a final RGB signal and ending the TTX processing when a TTX processing end request exists when the interrupt request signal is the TTX processing request after the CPU determines that the interrupt request signal is not the keyboard processing request signal in step (b), and carrying out a command related with the TTX when the interrupt request signal is not the TTX processing request;

(d) carrying out a command related with a keyboard when the interrupt request is the keyboard processing request signal in step (b), and determining whether the processing end request exists; and (e) carrying out a videotex processing when the videotex processing request exists before ending in the keyboard-related command processing step, and carrying out a command related with the videotex.

These and other objects, features and advantages of the invention are disclosed in or will be apparent from the following description of preferred embodiments.

BRIEF DESCRIPTION OF THE DRAWINGS

The preferred embodiments are described with reference to the drawings in which like elements are denoted by like or similar numbers and in which.

DETAILED DESCRIPTION OF THE PREFERRED EMBODIMENT

Figure 1:
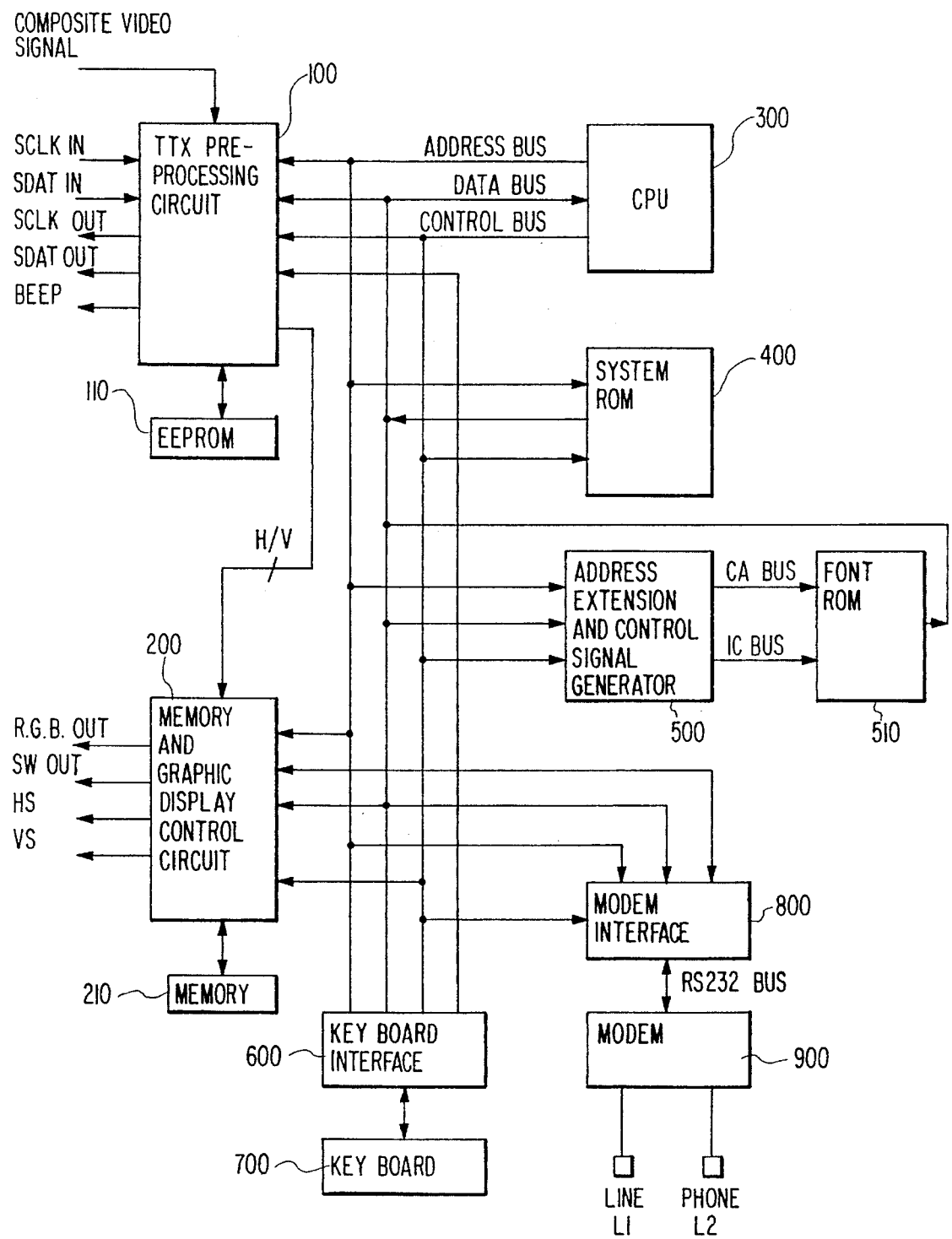
FIG. 1 is a partly schematic high level block diagram of a teletext and videotex processing system in accordance with a preferred embodiment of the present invention.
Figure 2:
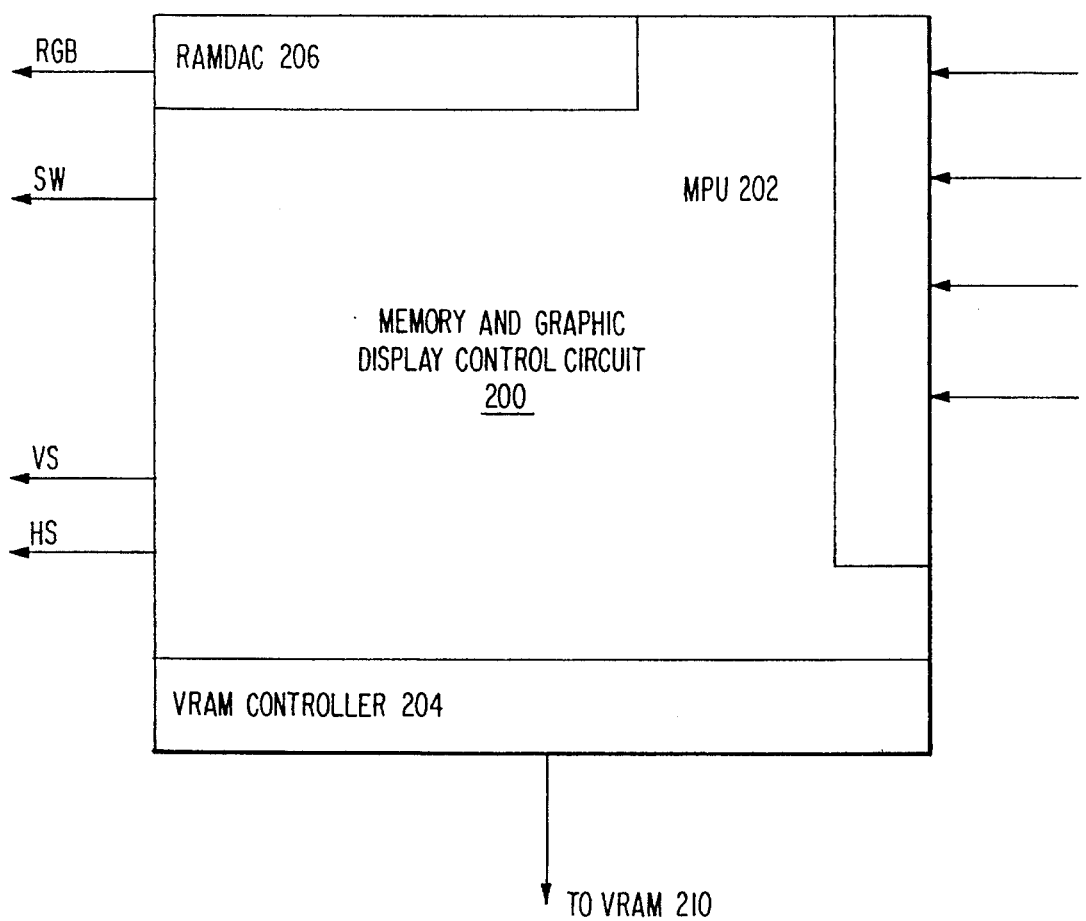
FIG. 2 is a detailed block diagram of a memory and graphic display controller of the block diagram of FIG. 1.

Referring to FIGS. 1 and 2, a teletext TTX pre-processing circuit 100 receives synchronous serial data from an external microcomputer or a digital system and makes a central processing unit CPU 300 carry out a proper command by interrupting the CPU 300 when receiving the serial data. Alternatively, the processing circuit 100 can generate the required synchronous serial data.

A composite video signal input from the outside is used for a synchronous isolation in an internal synchronous isolation terminal in the TTX pre-processing circuit 100. In addition, the composite video signal isolates a TTX data in a vertical blanking interval (VBI), makes the TTX data a parallel 8-bit data, stores the data in an internal memory, makes the CPU 300 store the TTX data stored presently in the internal memory of the TTX pre-processing circuit 100 into a main memory by interrupting the CPU 300.

A controller for controlling an electrical erasable programmable read only memory 110 (hereinafter referred to EEPROM 110) is mounted in the TTX pre-processing circuit 100. Accordingly, the data necessary for permanently storing a page number associated with the TTX and a telephone number for a videotex source may be read from or written to the EEPROM 110 in response to a request from CPU 300.

In addition, a microprocessor (MPU) interface advantageously is provided in the TTX pre-processing circuit 100 so as to permit a proper interface between an external bus, an address bus, a data bus and a control bus, and each internal block n the TTX pre-processing circuit 100. Accordingly, the data flowing between CPU 300 and an external circuit can be transmitted or received through the MPU interface.

In addition, the TTX pre-processing circuit 100 includes structure for generating a beep sound to the outside when wrong data has been input from a keyboard 700 or some other error occurs. Preferably, the beep sound is produced from a beep terminal.

Furthermore, a memory and graphic display control circuit 200 includes a MPU interface 202, a memory control circuit 203, a VRAM controller 204 and a random access memory digital-to-analog converter (RAMDAC) 206. The memory and graphic display control circuit 200 is controlled via the MPU interface 202, and may be used write to or read from the proper data.

Preferably, the memory control circuit 203 of circuit 200 writes the data input through the external address bus and the data bus as the data at the address in a memory 210 or produces corresponding data in response to a proper address, applied to the data bus of the CPU 300 after reading the data corresponding address when a read request by the CPU 300 exists.

Preferably, the VRAM controller 204 in memory and display control circuit 200 successively reads video data corresponding to a ROW of video display from a memory area in a display area, and transmits the data to the RAMDAC 206. The VRAM control circuit 204 writes a graphic color data on a palette RAM of the RAMDAC 206 responsive to the vertical synchronizing signal.

Advantageously, read time is determined on the basis of the horizontal/vertical synchronizing signals associated with the video when the data is read from VRAM 210. Accordingly, when an external horizontal/vertical synchronizing signal is input to the memory and graphic display control circuit 200, the signal is stabilized by an internal phase locked loop (PLL) circuit therein (not shown) and operated as a reference signal for each counter. In an exemplary case, an externally applied synchronizing signal advantageously can be used in the processing of TTX. In contrast, videotex is processed using self-generated horizontal/vertical synchronizing signal. This method is denoted the internal synchronizing method.

Preferably, the memory and graphic display control circuit 200 includes the palette RAM and an associated digital to analog converter, e.g., RAMDAC 206. The palette RAM stores color information associated with a graphic to be displayed on a screen. The data read from the video VRAM 210 is input to the address of the palette RAM and a proper color signal is produced for each position on the screen. Preferably, the palette RAM has three groups to make red, green and blue (RGB) color components, e.g., three primary colors. The three digital data are input to the RAMDAC 206 in three groups whereby a final analog RGB signal is produced.

A switching output signal SW OUT is among the signals produced from the memory and graphic display control circuit 200, which is used to switch the RGB signal provided as a main signal of a television and the memory and graphic display control circuit 200 at the proper time. The signals denoted HS and VS represent horizontal and vertical synchronizing signals, respectively. The videotex data is displayed in a sequential injection method using the HS and VS synchronizing signals during a videotex mode of operation.

It should be noted that a keyboard interface circuit relays data transmitted or received between the CPU 300 of the system and an external keyboard 700. Preferably, when keyboard interface circuit 600 receives data and the control signal from the CPU 300, it writes the data in a register (not shown) in keyboard 700 and a register in the keyboard interface circuit 600. When key data is input from the keyboard 700, the keyboard interface circuit 600 permits the CPU 300 to process the presently input command by interrupting the CPU 300.

An address extension and control signal generator 500 advantageously extends an address space of the CPU using a paging and segmenting technique. It will be appreciated that the address space is out of control of the CPU 300 when a font ROM 510 is used to generate a letter separately. The extended address is provided to a CA BUS, and applied to an address terminal of the font ROM 510. The paging and segmenting technique for extending the address space is well known. An extended bus is represented as the CA BUS.

In addition, the address extension and control signal generator 500 receives a control signal from CPU 300 and interrupt signal from a peripheral circuit, and produces the control signal related with chip select and read/write functions. Circuit 500 includes a state register capable of enabling a predetermined flag according to an interrupt priority detection and for applying a final interrupt enable signal to the CPU 300.

Preferably, the CPU 300 determines which interrupt occurs and carries out the proper interrupt processing after the CPU 300 receives the interrupt request signal. CPU 300 reads the state register in the address extension and control signal generator 500.

On the other hand, a modulator and demodulator (MODEM) interface 800 is connected to a MODEM 900 by a serial bus line, e.g., an RS232C bus line, for receiving data in an RS232C format from the MODEM 900 and for providing to the data bus connected with CPU 300, or for receiving 8-bit data via the data bus from CPU 300 and for transmitting the data serially to the MODEM 900 after converting the data into the RS232C format. It should be noted that MODEM interface 800 generates the control signal having the RS232C format while the data is transmitted or received, or carries out the proper process after decoding the input control signal. MODEM 900 has the same function to the conventional modem, i.e., MODEM 900 connects a public telephone network at L1 to the system according to the present system.

Preferably, system ROM 400 stores a program related with the system, e.g., an operation-related program for each function block described above, as well as the program for decoding the TTX/videotex.

Figure 3:
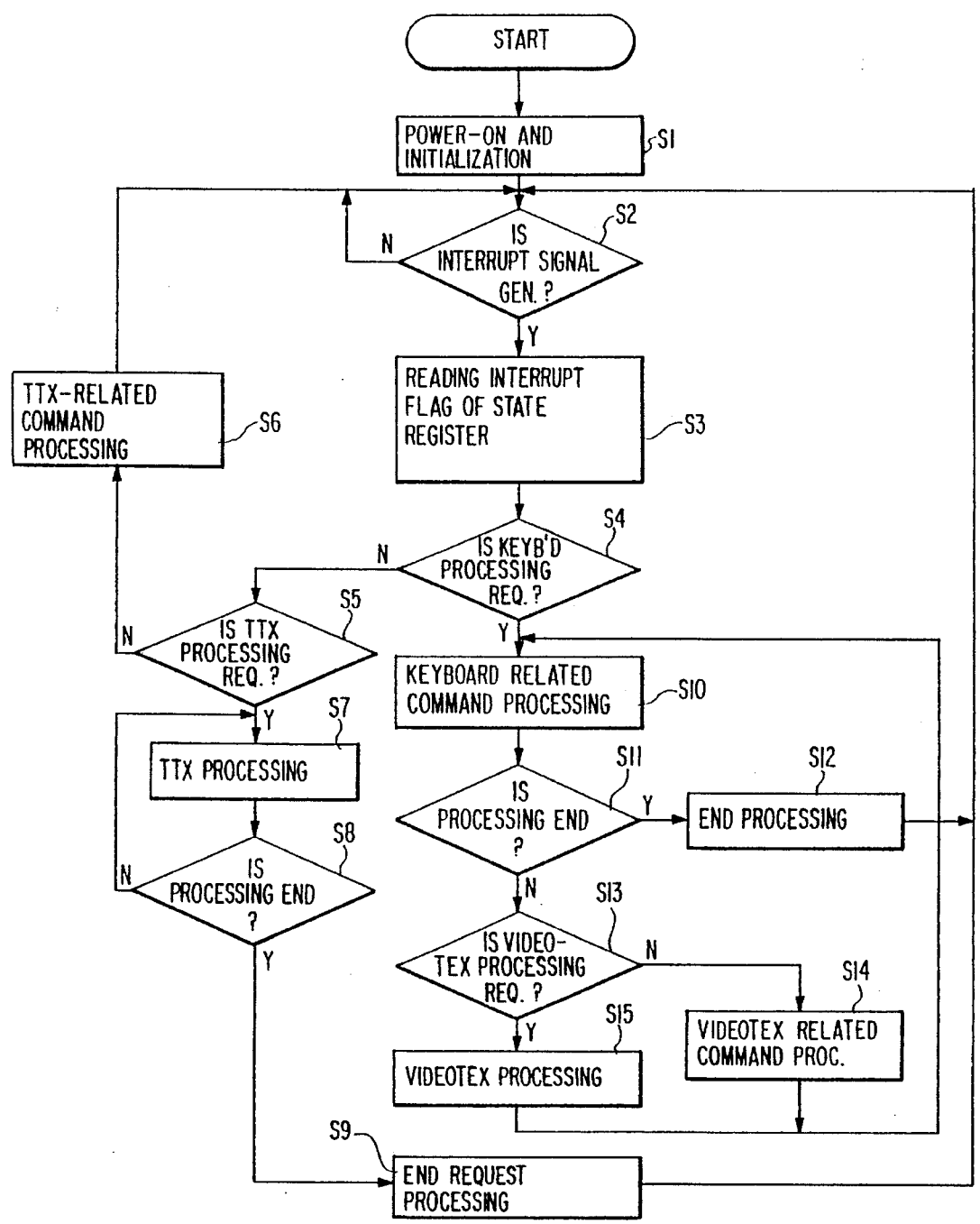
FIG. 3 is a detailed flowchart illustrating essential and supporting steps of a method for controlling the teletext and videotex processing system in accordance with the preferred embodiment of the present invention.

Referring to FIG. 3, a flowchart for implementing the present invention will now be described. According to FIG. 3, there are carried out the steps of determining whether the interrupt occurs, and reading the interrupt flag and determining whether the interrupt request is a keyboard processing request signal when the interrupt occurs. TTX processing can be carried out when the interrupt request is a TTX processing request, i.e., after determining whether the interrupt request is the TTX processing request when the interrupt request is not the keyboard processing request signal in the keyboard processing determining step. When the interrupt request is not the TTX processing request, a TTX processing step for processing a TTX-related command is implemented. When the interrupt request is the keyboard processing request signal in the keyboard processing determining step, a keyboard-related command is carried out, and a step for determining whether the processing ends, is carried out.

A videotex processing is carried out when the videotex processing request exists before ending in the processing end determining step, and a step for processing a videotex-related command is carried out when the videotex processing request does not exist.

Preferably, each of the circuits according to the present invention are connected to an internal address bus, a data bus and a control bus, and the control to each circuit can be accessed directly to each circuit after decoding of the proper control signal, respectively, by a memory map of the CPU 300.

The operation of the system according to the embodiment of the present invention will now be explained according to the flowchart of FIG. 3.

When power is applied to the system, the entire system is initialized by a reset signal. After the system has been initialized, a power-ON and initialization step S1 is carried out after the reset signal is released. Preferably, the power-ON and initialization step S1 includes substeps for writing initial operation mode data in a register associated with each circuit, clearing video area data in the VRAM, and resetting the palette RAM of the RAMDAC 206 to a black color level.

A step 2 for determining whether the interrupt request signal occurs after carrying out the power-ON and initialization step S1. A step S3 is then carried out for determining in which circuit the interrupt request signal originates after reading the state register in the address extension and control signal generator 500 when the interrupt request signal is detected.

Preferably, the interrupt request signal can occur in the following ways:

a) when processing a command input from the keyboard 700, b) when processing TTX data and TTX-related data;, and c) when processing the data input from the modem 900 and the data process.

The process according to the interrupt request is classified into the TTX-related processing, e.g., steps S5 to S9, and the videotex-related processing, e.g., steps S10 to S15.

It will be appreciated that a step S4 is carried out for determining whether the interrupt request is the keyboard processing request after analyzing the interrupt request signal. It will be noted that a step S5 is carried out for determining whether the interrupt request is the TTX processing request signal in a program routine when the interrupt request is not the keyboard processing request in step S4.

A step S6 is carried out for processing the command related with the TTX when the interrupt request is not the TTX processing request but the TTX-related command processing request in the TTX processing request determining step S5. Preferably, the TTX-related command processing writes the data in the palette RAM during the vertical synchronizing signal and then writes TTX data stored in the internal memory of TTX pre-processing circuit 100 to the main memory. In other words, in the TTX-related command processing step S6, the CPU 300 reads the state register in the TTX pre-processing circuit 100 and carries out the corresponding command when the interrupt request generated from the address extension and control signal generator 500 is the TTX-related command processing. Advantageously, the interrupt request of TTX pre-processing circuit 100 occurs when the serial data is input or when the vertical synchronizing signal is simultaneously generated with the TTX address.

After carrying out the TTX-related command processing step S6, the program routine returns again to the step S2 for determining whether the interrupt request signal occurs.

On the other hand, control passes to a step S7 for processing the TTX and produces the final RGB signal when the interrupt request is the TTX processing request, as determined during step S5. When a processing end request data to the data input to TTX pre-processing circuit 100 exists while carrying out the TTX processing step S7, as determined by step S8, step S9 is performed for processing the end request. Thus, the program routine returns to step S2 to repeatedly determine whether the interrupt request signal is received.

It will be appreciated that the end request processing step S9 includes substeps for converting the present screen from the TTX mode to the television mode by disabling the switching signal output SW OUT by the memory and graphic display control circuit 200, and clearing the video area in VRAM 210.

On the other hand, when the interrupt request signal originates from keyboard 700 as determined in the keyboard processing request determining step S4, step S10 is preformed for processing the keyboard-related command. In an exemplary case, the keyboard-related command processing step advantageously includes the following substeps.

(a) The horizontal/vertical synchronizing signal in the memory and graphic display control circuit 200 is converted into the internal synchronizing signal, and the present display resolution is converted into the resolution for the videotex;

(b) An RGB signal is produced by memory and graphic display control circuit 200, and the switching signal SW OUT is enabled, the horizontal/vertical synchronizing signal generated internally is produced such that the associated screen function as a monitor;

(c) The data input from the present keyboard 700 is decoded, and the RGB signal for displaying the proper letter on the screen is produced;

(d) The input data is decoded, and preparation for proceeding to the next routine is made; and (e) When the wrong key is input, the command is produced for generating the beep sound from the TTX pre-processing circuit 100.

A step S11 is then performed for detecting the processing end after carrying out the keyboard-related command processing step S10. When the processing end request exists during step S11, a step S12 is carried out the end processing request so that the keyboard-related command processing is ended, and the program routine returns to step S2. Preferably, when the processing end request is not detected during step S11, step S13 performed for determining the videotex processing request.

When the videotex processing request exists in the videotex processing request determining step S13, a step S15 corresponding to the requested processing, is carried out for processing the videotex. After the videotex processing has been carried out, the program routine returns to step S10 so as to process the next keyboard-related command. However, when the videotex processing request does not exist in the videotex processing request determining step S13, step S14 is performed for processing the videotex-related command. Subsequently, the program routine returns to the keyboard-related command processing step S10. It should be noted that the operations of the telephone memory, an automatic dial function, a videotex communication mode set and a videotex operation mode set, are carried out in the videotex-related command processing step S14.

After completing step S14 for processing the above-mentioned other commands, the program routine returns to the keyboard-related command processing step S10, i.e., the above-mentioned program sub-routine is carried out repeatedly as long as the processing end request does not occur. However, when the processing end request is input during the processing end step S11, the program performs processing end request step S12. The following operations are advantageously performed during this step:

(a) The switching signal SW OUT provided by memory and graphic display control circuit 200 is disabled, the videotex mode of operation is ended and the present operating mode is shifted the external synchronous mode;

(b) The video area in the video RAM is cleared; and (c) The data of each register in the memory and graphic display control block 200 is converted into the TTX-related data.

After the end request step S12 is finished, the program routine returns again to the step S2 for determining whether the interrupt request occurs.

As described the above, the present invention has an effect that the TTX and the videotex can be concurrently processed using one system. Advantageously, the TTX and videotex can be concurrently processed using a compact system.

It will be apparent to those skilled in the art that various modifications and variations can be made in the apparatus and method of the present invention without departing from the spirit or scope of the invention. Thus, it is intended that the present invention cover the modifications and variations

What is claimed is:

1. A teletext and videotex processing system, comprising:
a central processing unit (CPU);
first means for causing said CPU to process a present input data by interrupting said CPU, and for controlling an electrical erasable programmable ROM (EEPROM) storing a telephone number of a videotex source and permanent data for an operation mode therein after isolating teletext (TTX) data from one of an external serial data and an external image data and for storing said TTX data as internal data;
second means for synchronizing a video signal for controlling the video signal after receiving a horizontal/vertical synchronizing signal from said first means, for controlling an external video random access memory (VRAM), and for producing an external RGB signal through a random access memory digital to analog converter (RAMDAC);
third means for extending an address for controlling a font read only memory (ROM) and for producing a control signal for selecting each respective means of said processing system and for performing a read/write operation with respect to the internal data;
fourth means for providing an first interface function between an external keyboard and the processing system; and
fifth means for providing a second interface function between a selected one of said respective means and said CPU and a MODEM, wherein said fifth means is operatively connected to said MODEM via a bus line.

2. The system according to claim 1, wherein an interrupt request signal associated with said first means occurs when said first means receives serial data.

3. The system according to claim 1, wherein an interrupt request signal associated with said first means occurs when a vertical synchronizing signal is identical to an address of said TTX data.

4. A method for controlling a teletext and videotex processing system including a central processing unit (CPU), first means for isolating teletext (TTX) data from one of an external serial data and an external image data and for storing said TTX data as internal data, second means for synchronizing a video signal for controlling the video signal after receiving a horizontal/vertical synchronizing signal from said first means, for controlling an external video random access memory (VRAM), and for producing an external RGB signal for application to a screen through a random access memory digital to analog converter (RAMDAC), third means for providing an first interface function between an external keyboard and the processing system, and fourth means for providing a second interface function between a selected one of said respective means and said CPU and a MODEM, said method comprising the steps of:

(a) determining whether an interrupt request signal is produced after power is turned ON and a system is initialized;

(b) reading an interrupt flag and determining whether the interrupt request signal is a keyboard processing request signal after determining the interrupt request signal is produced during step (a);

(c) performing a TTX processing request, producing said RGB signal and ending the TTX processing when a TTX processing end request exists when the interrupt request signal corresponds to said TTX processing request after determining whether the interrupt request signal is said TTX processing request by determining that the interrupt request signal is not said keyboard processing request signal during step (b), and carrying out a command related with the TTX data when the interrupt request signal does not correspond to said TTX processing request;

(d) performing a command related with a keyboard when the interrupt request corresponds to said keyboard processing request signal during step (b) and then determining whether the processing end request exists; and (e) performing videotex processing when the videotex processing request exists before ending during step (d) and performing a command related to said videotex.

5. The method according to claim 4, wherein said step (a) includes a substep for producing said interrupt request signal includes processing of a command input from said keyboard, from TTX processing and respective data processing, and from data input via a MODEM and associated processing.

6. The method according to claim 4, wherein a TTX-related command processing substep in said step (c) step includes steps for:

(i) writing data into a palette RAM during a vertical synchronizing signal;

(ii) writing TTX data stored in a TTX memory into a main memory.

7. The method according to claim 4, wherein said step (c) includes the substeps for:

(i) disabling a switching signal output when the processing end request exists;

(ii) converting a present screen from a TTX mode of operation to a television mode of operation, and clearing a video area associated with a video RAM.

8. The method according to claim 4, wherein said step (d) includes substeps for:

(i) converting said horizontal/vertical synchronizing signal into an internal synchronizing signal;

(ii) converting a present display resolution associated with said screen into a videotex resolution;

(iii) shifting an associated screen operating mode to thereby provide as monitor function in response to a generated switching signal;

(iv) providing said RGB signal to said monitor;

(v) producing the RGB signal for displaying a proper letter on the screen after decoding input data from said keyboard; and (vi) producing a command for generating a beep sound when a wrong key of said keyboard is operated.

9. A method for controlling a teletext and videotex processing system including an interrupt controlled central processor unit, said method comprising the steps of:

(a) detecting an interrupt request signal;

(b) identifying whether the interrupt request signal is a keyboard processing request signal or not based on settings of a plurality of interrupt flags;

(c) when said interrupt request signal does not correspond to said keyboard processing request signal, performing teletex (TTX) processing;

(d) when said interrupt request signal corresponds to said keyboard processing request signal, performing a command related with said keyboard when the interrupt request corresponds to said keyboard processing request signal identified during step (b) and then determining whether the processing end request exists; and (e) performing videotex processing when the videotex processing request exists before ending during step (d) and performing a command related to said videotex.

10. The method according to claim 9, wherein said step (c) comprises the steps for:

(i) when said interrupt request signal corresponds to a TTX processing request, producing a final RGB signal and ending the TTX processing when a TTX processing end request exists when the interrupt request signal corresponds to said TTX processing request;

(ii) performing a command related with said TTX data when the interrupt request signal does not correspond to said TTX processing request.

* * * * *